United States Patent Office 3,086,906
Patented Apr. 23, 1963

3,086,906
DINITRO PHENOL AND DINITRO NAPHTHOL ALKANOLAMINE SALT PESTICIDAL COMPOSITIONS
Louis Werotte, Boitsfort, Belgium, assignor to Poudreries Reunies de Belgique Soc. An., Brussels, Belgium, a corporation of Belgium
No Drawing. Filed Sept. 26, 1955, Ser. No. 536,730
6 Claims. (Cl. 167—31)

The present invention relates to pesticidal compositions, and more particularly to highly effective pesticidal compositions comprising alkanolamine salts of dinitro phenols and dinitro naphthols, and to a process of making same.

Salts of dinitro phenols and dinitro naphthols, also designated as nitro dyestuffs, are used as pesticidal agents. The most commonly used pesticides of this type of compounds are 2,4-dinitro phenol, 2,4-dinitro-6-methyl phenol, and 2,4-dinitro naphthol. Preferred salts of said compounds are the sodium and ammonium salts thereof which are especially used for destroying insect eggs in wintertime and insects and other pests which hibernate as larvae. Said salts are also used for the control of cryptogams and weeds.

Ordinarily, said compounds are applied by spraying their aqueous solutions. However, attempts have been made, especially when applying said compounds to large areas, to replace such application by spraying by application by atomizing. Such an atomizing process consists in distributing the compounds in the form of a fine mist over the area to be treated. Thereby, the required amount of water is substantially smaller than when spraying an aqueous solution of said pesticides because the droplets of an atomized solution occupy a much smaller volume than the droplets of a sprayed solution.

Since, in principle at least, with both modes of application the same amount of active compound is to be applied to the unit of area, it is necessary to dissolve the pesticide in a much smaller quantity of water when atomizing the solution than it is required when spraying the same. Consequently, the water solubility of the pesticidal compound must be considerably greater for preparing solutions to be atomized than for preparing solutions to be sprayed.

The alkali metal salts of dinitro phenols and dinitro naphthols, however, are only comparatively slightly soluble in water. Therefore, it is ordinarily not possible to produce sufficiently concentrated solutions for application by atomizing.

The present invention has for its object to provide highly effective pesticidal compositions of the type of alkanolamine salts of dinitro phenols or dinitro naphthols which compositions are characterized by a specific method of preparation which method imparts to aqueous solutions of said compounds a low surface tension and, at the same time, a suitable pH-value.

Another object of the present invention is an advantageous process of preparing such highly effective pesticidal compositions that can effectively be applied by atomizing.

Other objects of the present invention and advantageous features thereof will become apparent as the description proceeds.

In principle, a pesticidal composition according to the present invention comprises a solution of alkanolamine salts of nitro dyestuffs, such as dinitro phenols and dinitro naphthols, which solution contains not only a surface active agent capable of sufficiently lowering the surface tension of the solutions, but also a buffer compound producing, on being dissolved in water, a predetermined weakly acid pH-value irrespective of the hardness of the water used. In this manner the activity of the pesticidal nitro dyestuff is increased to a very substantial and surprising extent.

It is not necessary to use an organic solvent for the production of the alkanolamine salts of dinitro phenols and dinitro naphthols. According to a preferred embodiment of the present invention said alkanolamine salts are readily obtained by simply suspending the nitro compound in water, adding the desired alkanolamine to the resulting suspension, and heating the mixture until complete solution is achieved. On cooling, the alkanolamine salt precipitates and is recovered by filtration. If desired, the filtered salt is dried and comminuted. The surface active compound and the buffer compound are added to the alkanolamine salt before or after drying. Preferably, the mother liquors are recycled and again used.

According to another embodiment of the present invention, first, a hot, highly concentrated solution of the respective alkanolamine salt is prepared. The surface active compound and the buffer compound are then added to said hot solution, and the mixture is passed over a roller dryer, while still hot. The dried product is finely comminuted.

According to still another embodiment of the present invention a homogeneous pesticidal preparation is obtained by melting together the nitro dyestuff and the desired alkanolamine, adding to the molten mixture a surface active compound and a buffer compound, allowing the mixture to cool, and first coarsely grinding and then finely comminuting the cooled mixture.

Preferred pesticidal nitro compounds which can be converted into their alkanolamine salts and can be treated in an appropriate manner according to the present invention are, for instance, 2,4-dinitro phenol,
2,5-dinitro phenol,
2,6-dinitro phenol,
2,6-dinitro-4-methyl phenol,
2,4-dinitro-6-methyl phenol,
2,4-dinitro-5-methyl phenol,
2,4-dinitro-1-naphthol, and, in general, all the dinitro phenols, dinitro naphthols, alkyl dinitro phenols, and alkyl dinitro naphthols.

Preferred alkanolamines for the preparation of salts of the above mentioned nitro compounds are mono-, di-, and triethanolamines, propanolamines, isopropanolamines, and the like.

Especially suitable surface active compounds are compounds which are capable of reducing the surface tension of aqueous solutions. In general, such surface active compounds belong to the group of anionic or non-ionogenic surface active compounds, such as, for instance, sulfated fatty alcohols, alkyl aryl sulfonates, condensation products of ethylene oxide with alkyl aryl phenols, and the like.

Said surface active compounds are added in amounts sufficient to produce a surface tension of 30 dynes to 40 dynes per cm. when employing the pesticidal agent in the conventional concentration of 1.5 g. to 30.0 g. per liter of aqueous solution. The surface tension of such a solution amounts to about 60 dynes per cm. if no surface active agent were added.

To achieve a pH-value which imparts to the pesticidal solutions optimum activity, buffer compounds such as, for instance, mixtures of mono- and di-sodium phosphate, of sodium bisulfate and di-sodium phosphate, or of sodium citrate and citric acid, mono-sodium phthalate, mono-sodium succinate, mono-sodium maleate and the like are admixed to said alkanol-amine salts.

The amounts of buffer compounds to be added to the pesticidal composition are sufficient to produce a pH-value betwen about 5.0 and about 6.8 under normal conditions of usage, even when using very hard water for preparing the pesticidal solution.

The following examples serve to illustrate the present invention without, however, limiting the same thereto. The amounts given in said examples indicate parts by weight.

Example 1

A mixture of 92 parts of 100% 2,4-dinitro phenol, 52.5 parts of 100% diethanolamine, and 40 parts of water is heated, while stirring, until complete dissolution is effected. The pH of said solution is adjusted to a pH of 6.5 to 6.7, in case the pH is higher than 6.7 by the addition of the required amount of 2,4-dinitro phenol and, in case the pH of said solution is lower than 6.5 by the addition of the required amount of diethanolamine. The resulting mixture is cooled to 10–15° C. Crystallization is initiated by seeding with a small amount of freshly produced crystals of the preparation. As soon as crystallization is completed, the crystalline mass is filtered and dried. The amount of the resulting paste corresponds to about 116 parts of dry substance. The mother liquors are used in a subsequent operation whereby further amounts of salt corresponding to 29 parts of dry substance are obtained. The total yield corresponds to about 100%.

The resulting paste obtained after filtering the crystalline mass of the diethanolamine salt of 2,4-dinitro phenol, is then worked up by admixing to the moist product a highly concentrated aqueous solution of mono-sodium phosphate and sodium dodecyl benzene sulfonate. Thereby, a preparation of the following composition (calculated for the dry preparation) is obtained:

| | Percent |
|---|---|
| Di-ethanolamine salt of 2,4-dinitro phenol (dry) | 86 |
| Mono-sodium phosphate | 7 |
| Sodium dodecyl benzene sulfonate (purity: 40%) | 7 |

Said mixture is first dried at 35° C. Thereafter, the temperature is gradually increased at the rate at which drying proceeds, to about 70° C. The dried product is comminuted.

A 1.5% aqueous solution of said preparation has a pH of 6.3 and a surface tension of 31.3 dynes per cm. at 18° C.

Example 2

99 parts of 100% 2,4-dinitro-6-methyl phenol, 74.5 parts of 100% tri-ethanolamine, and 175 parts of water are mixed and the mixture is worked up by following the procedure described in Example 1. Crystallization is initiated at 25° C. The yield corresponds almost to the theoretical yield.

To further work up the resulting paste obtained after filtering the crystalline mass of the tri-ethanolamine salt of 2,4-dinitro-6-methyl phenol, it is mixed with mono-sodium phthalate and the sodium salt of sulfated amide of palm kernel oil and, finally, yields a product of the following composition (calculated for the dry preparation):

| | Percent |
|---|---|
| Tri-ethanolamine salt of 2,4-dinitro-6-methyl phenol (dry) | 85.5 |
| Mono-sodium phthalate | 5.0 |
| Sodium salt of sulfated amide of palm kernel oil (purity: 30%) | 9.5 |

The resulting mixture is dried and comminuted.

A 1.5% aqueous solution of said mixture has a pH of 6.45 and a surface tension of 30.3 dynes per cm. at 18° C.

Example 3

117 parts (0.5 mol) of 100% 2,4-dinitro-1-naphthol are mixed with 30 parts of 100% mono-ethanolamine and 210 parts of water. The resulting mixture is worked up as described in the preceding examples. The yield is quantitative.

The resulting paste obtained after filtering the crystalline mass of the mono-ethanolamine salt of 2,4-dinitro-1-naphthol, is worked up by admixing thereto di-sodium citrate (or a corresponding mixture of tri-sodium citrate and citric acid) and the sodium salt of sulfated lauryl alcohol in amounts yielding a preparation of the following composition (calculated for the dry preparation):

| | Percent |
|---|---|
| Mono-ethanolamine salt of 2,4-dinitro-1-naphthol (dry) | 89.5 |
| Di-sodium citrate | 7.0 |
| Sodium salt of sulfated lauryl alcohol (purity: 85%) | 3.5 |

The resulting mixture is dried and comminuted.

A 1.5% aqueous solution of said mixture has a pH of about 5.5 and a surface tension of about 33.3 dynes per cm. at 18° C.

Example 4

99 parts of 100% 2,4-dinitro-6-methyl phenol, 30.5 parts of 100% mono-ethanolamine, and 24.5 parts of water are heated to 95–100° C. until complete dissolution is effected. Then 10.5 parts of sodium dodecyl benzene sulfonate (purity: 40%) and 10.5 parts of di-sodium citrate are added and the mixture is passed over a roller dryer, while still hot. The dried product is comminuted. The yield is quantitative.

A 3% aqueous solution of said preparation has a pH of 5.8 and a surface tension of 30.5 dynes per cm. at 18° C.

Example 5

99 parts of 100% 2,4-dinitro-6-methyl phenol are heated to a temperature of about 85° C. so as to form a molten mass. 52.5 parts of 100% di-ethanolamine are slowly added thereto and the temperature is raised to maintain the mixture in the molten state. As soon as the temperature of about 140° C. is reached, 12.25 parts of the sodium salt of sulfated lauryl alcohol and 12.25 parts of di-sodium citrate are added to the molten mixture. Said mixture is allowed to cool, first coarsely ground and then finely comminuted. The yield is quantitative.

A 2% aqueous solution of said preparation has a pH of 5.8 and a surface tension of 34 dynes per cm. at 18° C.

Example 6

99 parts of 100% 2,4-dinitro-6-methyl phenol, 37.5 parts of 100% mono-isopropanolamine, and 240 parts of water are mixed and the mixture is worked up by following the procedure described in Example 1. It is not necessary to initiate crystallization. The yield corresponds to almost the theoretical yield.

To further work up the resulting paste obtained after filtering the crystalline mass of the mono-isopropanolamine salt of 2,4-dinitro-6-methyl phenol, it is mixed with di-sodium citrate and the polyoxyethylene ether of nonyl phenol. Thereby a product of the following composition (calculated for the dry preparation) is obtained:

| | Percent |
|---|---|
| Mono-isopropanolamine salt of 2,4-dinitro-6-methyl phenol dry | 86 |
| Di-sodium citrate | 7 |
| Polyoxyethylene ether of nonyl phenol (purity: 40%) | 7 |

The resulting mixture is dried and comminuted.

An 0.5% aqueous solution of said mixture has a pH of 6.8 and a surface tension of 34.2 dynes per cm. at 18° C.

In place of 2,4-dinitro phenol, 2,4-dinitro-6-methyl phenol, and 2,4-dinitro-1-naphthol used in the preceding examples there can be employed equimolecular amounts of other dinitro phenols and dinitro naphthols as mentioned hereinbefore.

Likewise, in place of mono-, di-, tri-ethanolamine and mono-isopropanolamine used for salt formation in the preceding examples, there can be employed other alkanolamines as mentioned hereinbefore.

Otherwise, the procedure is about the same as in said preceding examples.

Of course, many changes and variations in the pesticidal nitro compounds, in the alkanolamines used for salt formation, in the surface active compounds and in the buffer compounds added to said alkanolamine salts of dinitro phenols and naphthols, in the methods of preparing said alkanolamine salts, of admixing thereto the surface active compounds and the buffer compounds, of isolating and drying the resulting pesticidal preparation and the like may be made by those skilled in the art in accordance with the principles set forth herein and in the claims annexed hereto.

I claim:

1. The pesticidal composition comprising the di-ethanolamine salt of 2,4-dinitro phenol, mono-sodium phosphate, and sodium dodecyl benzene sulfonate, said compounds being intimately mixed with each other, the mono-sodium phosphate and the sodium dodecyl benzene sulfonate being present in said composition in an amount sufficient to impart to a 1.5% aqueous solution of said composition a pH of about 6.3 and a surface tension of about 31 dynes per cm. at 18° C.

2. The pesticidal composition comprising the tri-ethanolamine salt of 2,4-dinitro-6-methyl phenol, mono-sodium phthalate, and the sodium salt of sulfated neutralized amide of palm kernel oil acids, said compounds being intimately mixed with each other, the mono-sodium phthalate and the sodium salt of sulfated neutralized amide of palm kernel oil acids being present in said composition in an amount sufficient to impart to a 1.5% aqueous solution of said composition a pH of about 6.5 and a surface tension of about 30 dynes per cm. at 18° C.

3. The pesticidal composition comprising mono-ethanolamine salt of 2,4-dinitro-1-naphthol, di-sodium citrate, and the sodium salt of sulfated lauryl alcohol, said compounds being intimately mixed with each other, the di-sodium citrate and the sodium salt of sulfated lauryl alcohol being present in said composition in an amount sufficient to impart to a 1.5% aqueous solution of said composition a pH of about 5.5 and a surface tension of about 33 dynes per cm. at 18° C.

4. The pesticidal composition comprising the mono-ethanolamine salt of 2,4-dinitro-6-methyl phenol, di-sodium citrate, and sodium dodecyl benzene sulfonate, said compounds being intimately mixed with each other, the di-sodium citrate and the sodium dodecyl benzene sulfonate being present in said composition in an amount sufficient to impart to a 3% aqueous solution of said composition a pH of about 5.8 and a surface tension of about 30.5 dynes per cm. at 18° C.

5. The pesticidal composition comprising the di-ethanolamine salt of 2,4-dinitro-6-methyl phenol, di-sodium citrate, and the sodium salt of sulfated lauryl alcohol, said compounds being intimately mixed with each other, the di-sodium citrate and the sodium salt of sulfated lauryl alcohol being present in said composition in an amount sufficient to impart to a 2% aqueous solution of said composition a pH of about 5.8 and a surface tension of about 34 dynes per cm. at 18° C.

6. The pesticidal composition comprising the mono-isopropanolamine salt of 2,4-dinitro-6-methyl phenol, di-sodium citrate, and the polyoxyethylene ether of nonyl phenol, said compounds being intimately mixed with each other, the di-sodium citrate and the polyoxyethylene ether of nonyl phenol being present in said composition in an amount sufficient to impart to an 0.5% aqueous solution of said composition a pH of about 6.8 and a surface tension of about 34 dynes per cm. at 18° C.

References Cited in the file of this patent

UNITED STATES PATENTS

| | | |
|---|---|---|
| 2,210,929 | Heath et al. | Aug. 13, 1940 |
| 2,222,486 | Moore | Nov. 19, 1940 |
| 2,328,505 | Smith et al. | Aug. 31, 1943 |
| 2,345,901 | Sullivan et al. | Apr. 4, 1944 |
| 2,579,430 | Hammer | Dec. 18, 1951 |